US007864927B2

(12) United States Patent
Loizeaux

(10) Patent No.: US 7,864,927 B2
(45) Date of Patent: Jan. 4, 2011

(54) MULTI-SITE PERSONAL EMERGENCY TELEPHONE SYSTEM METHOD AND DEVICE

(76) Inventor: Marion Alice Loizeaux, 3 Grange St., Greenwich, CT (US) 06830

( * ) Notice: Subject to any disclaimer, the term of this patent is extended or adjusted under 35 U.S.C. 154(b) by 1218 days.

(21) Appl. No.: 11/344,759

(22) Filed: Feb. 1, 2006

(65) Prior Publication Data

US 2007/0082651 A1    Apr. 12, 2007

Related U.S. Application Data

(60) Provisional application No. 60/649,011, filed on Feb. 1, 2005.

(51) Int. Cl.
*H04M 11/00* (2006.01)
(52) U.S. Cl. .............................. 379/37; 379/40; 379/45; 455/404.1
(58) Field of Classification Search ............. 379/37–45, 379/90.01, 93.05; 455/404.01, 404.02, 462, 455/463, 465, 426.1, 426.2, 410, 411
See application file for complete search history.

(56) References Cited

U.S. PATENT DOCUMENTS

| | | | |
|---|---|---|---|
| 4,736,404 A * | 4/1988 | Anglikowski et al. ....... 455/411 |
| 5,539,803 A * | 7/1996 | Bhat et al. ..................... 379/21 |
| 5,890,069 A * | 3/1999 | Evans et al. .................. 455/462 |
| 6,236,186 B1 * | 5/2001 | Helton et al. ................ 320/106 |
| 7,013,153 B2 * | 3/2006 | Beamish et al. ............. 455/462 |
| 2003/0027547 A1 * | 2/2003 | Wade ......................... 455/404 |
| 2003/0087628 A1 * | 5/2003 | Michibata .................... 455/404 |
| 2004/0224701 A1 * | 11/2004 | Lewis-Evans et al. ..... 455/456.2 |
| 2005/0059443 A1 * | 3/2005 | Pan et al. .................. 455/575.4 |
| 2005/0259641 A1 * | 11/2005 | Beninato et al. ............. 370/354 |
| 2006/0007915 A1 * | 1/2006 | Frame ......................... 370/352 |

* cited by examiner

*Primary Examiner*—Melur Ramakrishnaiah

(57) ABSTRACT

A method and continually wearable device for one-button emergency calling, direct to the local emergency responder, from anywhere worldwide where the user is within cordless phone range of their extensive, personally-tailored network of secure, pre-authorizing landline base units. In the U.S., the local emergency responder instantly receives the users' call-back number and instant street address with on-site directions through Enhanced 911. The wearable device provides 2-way audio communication with the local emergency responder in either speakerphone, phone or monitor-only modes. The method of adding an emergency calling authorization to a users' network is for the user to place their call pod on the base unit to grant authorization, the base owner then enters his password and the call pod owners name and presses the 'authorize' button. An adjustable strap holds the device to the users' body, or the device may be incorporated into other items which are worn or carried.

10 Claims, 1 Drawing Sheet

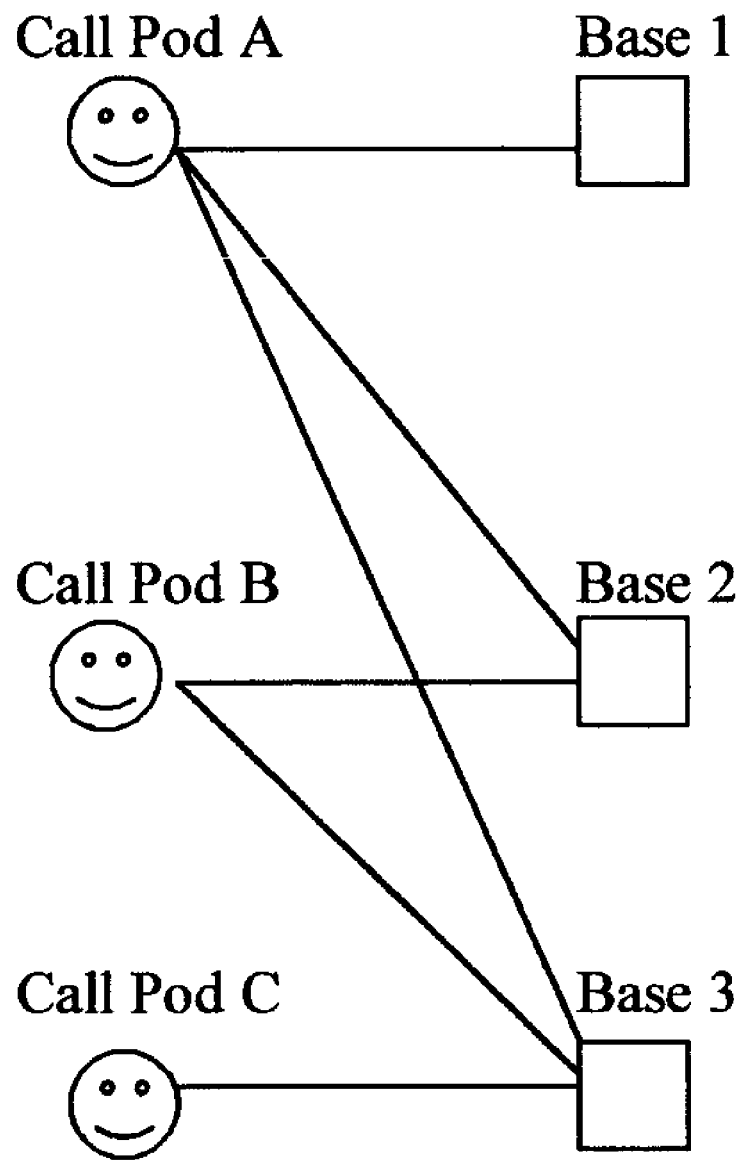

MULTI-SITE PERSONAL EMERGENCY TELEPHONE SYSTEM METHOD AND DEVICE

CLAIMING THE BENEFIT OF U.S. PROVISIONAL PATENT APPLICATION

U.S. 60/649,001 Filed: Feb. 1, 2005

U.S. PATENT DOCUMENTS

| | | | |
|---|---|---|---|
| 4,908,602 | March 1990 | Reich, et al. | 340/514 |
| 5,305,370 | April 1994 | Kearns et al. | 379/45. |
| 5,555,287 | September 1996 | Gulick, et al. | 455/557 |
| 5,673,304 | September 1997 | Connor et al. | 379/45 |
| 5,818,931 | October 1998 | Movassaghi | 379/445 |
| 5,694,452 | December 1997 | Bertolet | 379/51 |
| 6,518,889 | February 2003 | Schlager, et al. | 340/573.1 |
| 2002/0127994 | September 2002 | Stanners | 455/404 |
| 2003/0027547 | February 2003 | Wade | 455/404.1 |
| 2003/0087628 | May 2003 | Michibata, Yasuyo | 455/404.1 |

BACKGROUND OF THE INVENTION

This invention relates to devices for making telephone calls and, more particularly, for making telephone calls to emergency responders in emergency situations.

There is currently a severe gap in the emergency response infrastructures, worldwide. This critical gap is the physical distance between a victim experiencing an emergency (either a criminal, fire or medical emergency), and a landline telephone to summon aid. The severe and critical limitations, difficulties and disadvantages of summoning help other than via landline phone are described in the Background of the Invention section, below. Calling via landline telephone is the fastest way for a victim to get the help they need. This is because landline emergency calls are automatically routed directly to the caller's local PSAP (Public Safety Answering Point), and the PSAP is the entity which dispatches the appropriate emergency help: either police, fire, or medical personnel and equipment, or a combination thereof. The fastest possible response time is very important, because in emergencies, minutes and seconds can mean the difference between life and death.

The very nature of a criminal, fire or medical emergency can be what prevents a victim from reaching a phone, and thus from reaching the desperately needed help in time. Such may be the case, for example, when there is domestic violence, when there is an intruder or assailant, when there is a fire, a heart attack, a TIA, stroke, a diabetic shock, a severe asthma attack or a severe allergic reaction, a fall, a severe injury, badly interacting medications, or an overdose. In certain circumstances, a victim may only have brief seconds between the realization that they are in very serious trouble and unconsciousness, which easily may not be enough time to reach a phone, or else they may quickly become too mentally or physically impaired to reach a phone. Also an intruder, or violent individual, may prohibit a victim from reaching a phone. The very nature of a victim's emergency can be what prevents them from having the freedom, mobility, ability, or time necessary to reach a phone.

Technology has enhanced, and speeded access to, the public health and public safety systems in amazing ways. Yet it is obvious that all these technological and infrastructure improvements are for naught if a victim cannot reach a phone to summon help. Here are some of these public health and public safety improvements:

First, there are nationally enacted, simple, memorable, national 3-digit emergency phone numbers to dial to summon help from any phone, nationwide. For example, there's 9-1-1 in North America and 1-1-2 in Europe.

Second, these national emergency phone number calls are answered by local PSAP's, or Public Safety Answering Points, which have specially trained call takers to handle the emergency call, to give instructions to the caller and to dispatch the appropriate local emergency responders and emergency equipment to the emergency.

Third, there's the ubiquitous and extremely reliable nationwide landline telephone network.

Fourth, there's the nationwide system, called Enhanced 9-1-1 in the USA, for incoming landline phone calls, which instantly and automatically gives the PSAP the exact address of the phone making the call, with on-site directions, such as "Apartment E, $2^{nd}$ floor, $3^{rd}$ door on the left". This is vital to speed dispatch when a victim is unable to provide this information, ie. due to lack of knowledge, blacking out, choking, an intruder, etc. Enhanced 9-1-1 also instantly provides the name of the person to whom the phone number is issued, and the callers' phone number. Having the phone number is important when a callback is needed due to disconnection, or for further direction giving or information gathering.

Fifth, there are special radio networks connecting the PSAP's with the emergency responders.

Sixth, these emergency responders have police cars, and fire and ambulance services standing by.

Seventh, the police are specially trained in handling emergencies, and they have a plethora of skills, from subduing violent individuals, to negotiation skills in domestic abuse and hostage situations, to handling medical emergencies. They also have several levels of weaponry to deal with violent individuals, from batons and stun guns, to guns. They have tools for medical aid which can range from first aid and CPR knowledge, to portable oxygen units and defibrilators.

Eighth, firemen have extensive training and trucks with ladders, pumps, water, and chemical fire suppressants.

Ninth, ambulances are mini mobile emergency rooms, which can use triage and begin life-saving efforts immediately, and which can radio ahead to alert a hospital to the needs of the incoming victim. At the hospital, there are dramatic advances in knowledge, drugs, imaging technology and surgery. There are also med-evac helicopters, hospitals with helicopter landing pads, and hospitals with areas of specialization, such as burn units or open heart surgery.

All of this infrastructure, however, is for naught if A) the victim cannot reach a phone to summon help, or B) the means of summoning help causes delays that prevent the needed help from arriving in time. Time is obviously critical when an individual has impaired or stopped breathing, or when his heartbeat is intermittent or stopped.

This present invention is A) tiny enough to be worn continually, so it's always available and within reach of the user, and B) the fastest way to contact the local PSAP dispatchers.

Existing portable technologies are far inferior to the present invention for summoning emergency help. Devices for making telephone calls to emergency responders in emergency situations fall into five broad categories:

(1) devices that are solely fixed to a landline phone jack wall outlet;
(2) devices that are fixed to a landline phone jack wall outlet and have a portable cordless handset such as that disclosed in U.S. Pat. No. 5,305,370;

(3) devices that are fixed to a landline phone jack wall outlet and have a portable cordless medallion such as that disclosed in U.S. Pat. No. 5,673,304;

(4) devices that are mobile and utilize cellular phone technology such as that disclosed in U.S. Pat. Appl. Pub. No. US 2002/0127994 A1; and (5) devices that are mobile and utilize satellite phone technology such as that disclosed in U.S. Pat. No. 6,518,889s.

There are problems and limitations with all of these devises. Devices fixed to a landline phone jack wall outlet require the caller to travel to the fixed location of the devise to initiate the emergency call. Thus, a significant delay is incurred in a situation where speed is essential, critical, and possibly life-saving. Also, the caller is required to leave the site of the emergency. Thus, the caller is unable to render needed assistance at the site of the emergency. Also, if the victim is alone, he or she may be unable to travel to the fixed location of the devise due to the emergency. This may be the case in fire emergencies, and in medical emergencies such as heart attack, stroke, and accidental injury. Also, criminal emergencies such as kidnapping, assault, robbery, and domestic abuse may involve one or more perpetrators who prevent the victim from traveling to the fixed location of the devise.

Although cordless handset devices offer remote initiation of emergency phone calls, they are too bulky and cumbersome to be carried or worn on the users person all the time. Thus, the user has no certainty of the handset being within reach at the time of the emergency. Also, a cordless handset device requires recurring recharging of its battery on its base unit, which is plugged into an electrical outlet. This is required at varying intervals of time depending on usage. Thus, it is uncertain whether the cordless handset device will have an adequately charged battery to be operable at the time of the emergency. And thus, there are recurring time periods while its battery is being recharged on its base when the cordless handset is unusable by the user. Also, the cordless handset is limited to initiating telephone calls via its own base. Thus, the usefulness to the user of the cordless handset devise is limited to the time period when the user is within cordless telephone range of that single base unit.

Medallion devices that communicate to a base fixed to a landline phone jack wall outlet, and medallion devices that are remote activators of alarm systems, do not have audio transmission capability. Thus, the user is unable to verbally communicate with the emergency responder whom they have called. Thus, the emergency responder is unable to determine the nature of the emergency. Thus, the emergency responder is unable to select and dispatch the appropriate help for the emergency, whether fire, police or ambulance. Although some bases have speakerphone capability, and some secondary speakerphones may be installed at the users location, unless the emergency victim is near one of these speakerphones they will still be unable to communicate with the emergency responder. Due to this lack of audio communication capability, medallion devices must call a pre-programmed number for a commercial central monitoring station (CCMS), rather than the local 911. Upon receipt of a call from a customer, the CCMS then calls a pre-determined list of friends and/or relatives and/or neighbors to dispatch them to the caller to determine if there is an emergency, and if so, to determine the nature of the emergency. Thus, a significant delay is incurred in a situation where speed is essential, critical, and possibly life-saving. If the CCMS is unable to reach a person on that pre-determined telephone list, then the CCMS must call the local police, or the local public safety answering point (PSAP). The PSAP is the local dispatcher of emergency vehicles, or the local call screener and relayer of emergency calls to the dispatcher of one or more of the local emergency services of fire, police and ambulance The CCMS may be located in another state or across the country. Thus, this call from the CCMS to the police or PSAP cannot be made with the national emergency telephone number, such as 911 in the U.S., because calling 911 would reach the PSAP in the CCMS's local community, not the PSAP in the emergency victim's community. The call to the police or PSAP must be made on an administrative, non-priority telephone number. Thus, there may be a significant delay while the CCMS tries to determine which is the correct police or PSAP jurisdiction that dispatches to the victim's location. There may then be another delay while the CCMS determines what is the proper administrative telephone number for that police station or PSAP. With the rapid increase in new telephone exchanges and area codes, and with PSAPs that change location or obtain new equipment, databases of administrative numbers for PSAPs may become obsolete. Also, due to geographic features, irregular community borders, and irregular jurisdictions, the administrative telephone number selected may not be the nearest, or the jurisdictionally responsible, police station or PSAP. Thus, further delays may be incurred as the called police station or PSAP determines the exact location of the emergency, determines which is the appropriate responder, and attempts to forward the call or relays the information to the CCMS, who then determines the new administrative number and calls it. Also, calls coming in on administrative numbers do not come in to the dedicated emergency responder's call station console. Thus, they cannot be easily transferred to another jurisdiction, which causes further delay. Also, unlike 911, administrative telephone numbers are not priority numbers. Thus, these calls are not answered with the same urgency or priority as an emergency call; and if the call is made after-hours, or if the police or PSAP are under-staffed or busy, a call coming in on an administrative number may not be answered at all. Also, calls that come in on administrative numbers do not link with the ubiquitous Enhanced 911 system, as 911 calls do. Enhanced 911 provides ANI (Automatic Number Identification) data that instantly displays the victim's calling number. Thus, the recipients of the transferred emergency call are unable to call back the victim if the victim's call is accidentally or maliciously disconnected, or if they require further information. Enhanced 911 also provides ALI (Automatic Location Identification) data that instantly provides the victim's exact street address, and provides on-site directions which are essential when responding to multi-family dwellings and apartment houses. Thus, the recipients of the transferred emergency call do not have a display of the victim's exact street address information with on-site directions. And thus, they cannot relay the missing location information electronically to a console in a fire, police or ambulance vehicle. Also, for calls coming in on administrative numbers, significant risk of human error is introduced e.g., through dyslexic transposition of numbers, or misreading or misspeaking information. The telephone number of the victim, if available and if noted by the CCMS, along with the location of the emergency, must be communicated several times. It must be verbally communicated by the CCMS, manually transcribed by the person answering the administrative number, relayed to the dispatcher, and verbally relayed by the dispatcher to the personnel responding to the emergency. Thus, the risk of human error is introduced by the CCMS, the transcriber, the dispatcher and the responding personnel. Also, medallions must pay a substantial, recurring monitoring fee to their CCMS for service. Thus, medallions are costly and this cost can be psychologically or financially prohibitive to many individuals.

Wireless devices, which include mobile and cellular devices, are still too large for many people to carry or wear them on their person all the time. Thus, the user has no certainty of the wireless device being within reach at the time of an emergency. Also, a wireless device requires recurring recharging of its battery, by plugging it into a charger which is plugged into an electrical outlet. This is required at varying intervals of time depending on usage. Thus, it is uncertain whether the wireless device will have an adequately charged battery to function at the time of an emergency. And thus, there are recurring time periods while its battery is being recharged when the wireless device is unusable by the user. Also, the wireless device is only works while it is within range of a transmission tower in its network. Also, geographic and architectural features may severely interfere with, or prohibit, transmission to a tower in its network. Thus, the usefulness to the user of a wireless device is limited to the time period when the user is within uninterfered range of a transmission tower in its network. Also, most wireless calls to 911 are routed to and answered by a state police barrack or a regional wireless emergency answering point, either of which could be a hundred miles or more away from the caller, or in a different state. Thus, the wireless emergency 911 call was routed to an entity that cannot provide direct, immediate help. Like the problem facing the CCMS, described above for medallion callers, the state police or wireless regional answering point must try to ascertain the geographically and jurisdictionally correct local PSAP to call. They must then determine the administrative telephone number for that PSAP. That number is not a priority emergency number, and may be delayed in being answered or may not be answered at all. That number may have changed due to a move or a change in area codes, exchanges or new equipment. That number will not be linked to the emergency response person's emergency call-taking console. The call will not come in with the ANI or ALI data of Enhanced 911. Information such as the victim's name, the victim's phone number, the victim's location and the nature of the emergency will have to be communicated verbally to the state police or regional wireless answering point. Then the information must be recorded manually, communicated to one or more local PSAPs via administrative telephone numbers, recorded manually again each time, manually delivered to the emergency call-taker at the emergency call-taking console, read and relayed verbally to the local emergency responder, or read and relayed to a local emergency dispatcher who will record it manually again and then read and relay it verbally to a local emergency responder. Thus, each of these steps incur critical time delays and incur critical risks of errors in typing, handwriting, deciphering handwriting, reading, verbalization, pronunciation, of dyslexia and the like. Also, if a wireless device presents a problem if the caller is unable to state their location, which could be the case if the call is accidentally or maliciously terminated early, if the caller loses consciousness, if the caller has a closed airway from a blockage, asthma or an allergic reaction, or if they are being prevented from speaking due to a domestic abuse situation, an intruder, or an assailant. It's also a problem when the emergency has impaired a victim's cognitive function, which can happen to victims of TIA, stroke, diabetic shock, and overdose. It's also a problem if the victim doesn't know their exact address because they are a child, or because they are just visiting a location. Current cell phone location finding technologies are based on either network based solutions, such as tower triangulation, or on handset based solutions, such as Global Positioning System—GPS, or combination network/handset based solutions, such as Assisted GPS—A-GPS. These solutions all take from 2 to 7 minutes to determine a location. Thus, they create a significant and critical delay in the dispatching of aid to the emergency location. Also, a location is currently accurately obtainable only 60% of the time. Thus, there is a 40% chance that no help will be able to be dispatched at all. Also, the above statistics of 2 to 7 minutes to determine a location and that being obtainable only 60% of the time only apply to the fraction of PSAPs that have the equipment to attempt the location of a wireless call. Thus, many PSAPs are entirely unable to locate an emergency caller who calls with a wireless device. Also, even if the PSAP does have locating equipment, the location which may ultimately be obtained (60% of the time), will not be a street address, but geographic coordinates of latitude and longitude. These will not necessarily be a location on a street, but could be somewhere between streets. There is further risk of imprecision because the computerized local geographic maps are created with many data points obtained in the field and inputted manually. Also, the geographic location of latitude and longitude does not yield a precise point, but a range. In 1996, the Federal Communications Commission adopted wireless E-911 rules, establishing a location accuracy requirement of "100 meters for 67 percent of calls and 300 meters for 95 percent of calls". Subsequent advances in handset based location technologies caused the Commission to revise its rules to accommodate these developments, and in so doing, they imposed the more stringent accuracy requirement for handset based solutions; namely, "50 meters for 67 percent of calls and 150 meters for 95 percent of calls". Thus, the required location range is 150 to 450 feet for handset based solutions, and 300 to 900 feet for network based solutions. Ranges of 150 feet to 900 feet could include many, many homes in suburban locations, or hundreds of apartments in a city. Also, there is also no z-coordinate telling which floor the call came from, another great handicap in an urban location. Thus, these are situations in which emergency location of a wireless device is impossible. In a suburban area, a typical example of a location obtained from an emergency call made by a wireless device would be "within 150 to 900 feet of a point 0.37 miles eastsoutheast of the intersection of Maple Street and Northern Avenue". An emergency call from the exact same spot made by the present invention would be "42 Aspen Street, Apartment E, $2^{nd}$ floor, 3rd door on left". In an urban area, a typical example of a location obtained from an emergency call made by a wireless device would be "within 150 to 900 feet of a point 0.03 miles northeast of the intersection of $81^{st}$ Street and Fifth Avenue". An emergency call from the exact same spot made by the present invention would be "582 Fifth Avenue, Apartment 15J, 15th floor, $7^{th}$ door on the left". Also, wireless devices must pay significant, recurring monitoring fees to their wireless provider for service. Thus, owning a wireless device for emergency calling purposes becomes costly over time, and this cost can be psychologically or financially prohibitive to many individuals.

Devices that are mobile and utilize satellite phone technology are too large, bulky and cumbersome carry or wear on a users person all the time. Thus, the user has no certainty of the satellite device being within reach at the time of an emergency. Also, a satellite device requires recurring recharging of its battery, by plugging it into a charger which is plugged into an electrical outlet. This is required at varying intervals of time depending on usage. Thus, it is uncertain whether the satellite device will have an adequately charged battery to function at the time of an emergency. And thus, there are recurring time periods while its battery is being recharged when the satellite device is unusable by the user. Also, the satellite device only works when it is able to obtain line of sight transmission and reception with the satellite. Thus, it is severely limited to operating outdoors or through a window. Also, it requires a period of time to acquire a fix on a satellite. Thus, there is a delay that is unacceptable in an emergency. Also, to obtain the callers location requires that a theoretical minimum of three satellite fixes be acquired. In actual practice, five or six satellite fixes are usually necessary. Each satellite acquisition takes additional time. Thus, satellite location causes further delays which are unacceptable in an emergency. Also, satellite location is obtained through GPS which, like wireless devices, is based on latitude and longitude. Thus, it is limited by the imprecision of the computerized local geographic maps. Also, satellite devices are extremely costly and their costs per call are very high Thus, the expense of owning a satellite device for emergency calling purposes is psychologically and financially prohibitive to most individuals.

Accordingly, it is an object of the present invention to provide an emergency calling device which can directly call the national emergency telephone number, such as 911 in the U.S., which overcomes or greatly alleviates the foregoing problems and shortcomings of prior devices.

It is a further object of the invention to provide an emergency calling device which is inexpensive to purchase, has no recurring monitoring or other fees, and can be conveniently and unobtrusively carried or worn by the user at all times.

It is a further object of the invention to provide an emergency calling device which does not require any battery recharging by the user, thus no downtime, and that has backup battery power for operation during power outages.

A further object of the invention to provide an emergency calling device which has a wearable call pod with a single button to provide single button emergency calling capability, and a sliding cover over the single button to protect the button from accidental activation and to enable single-handed calling operation while in the users pocket.

It is still a further object of the invention to provide an emergency calling device which has wearable call pod with a microphone and a speaker for 2-way audio communication, and a 3 position switch providing single-handed selection of one of 3 modes: speakerphone, phone, and monitor-only meaning mute.

It is still a further object of the invention to provide an emergency calling device which has a base unit that connects to a landline phone line to provide maximum reliability and Enhanced 911 ANI and ALI capability for every emergency call.

It is still a further object of the invention to provide an emergency calling device which has a base unit that uses password protected call pod authorization to prevent mischievous or malicious calling of the emergency number.

It is still a further object of the invention to provide an emergency calling device which has a base with password protection that can selectively deauthorize a call pod, such as that of a former employee who may otherwise misuse their call pod for mischievous or malicious calling.

It is still a further object of the invention to provide an emergency calling device which has a base that can authorize a multiplicity of call pods, that can store and display each authorized call pod owners name, and can recall and display the call pod owners name of each call pod that places an emergency call via that base.

It is still a further object of the invention to provide an emergency calling device which has a call pod that can be authorized by a multiplicity of bases, so that the user can have emergency calling capability in and around an extensive network of locations they may frequent, such as home, farm, school, dorm, work, church, homes of friends, neighbors and relatives, gym, cottage, ice rink, swim club, golf club, and soup kitchen.

It is a further object of the invention to provide an emergency calling device with a call pod which will use a separate, replaceable, secondary battery to check to see if it is within calling range of an authorizing base unit whenever the user slides open its sliding cover; and if it is within range an audible dial tone will be heard. Meanwhile, the primary, replaceable battery is reserved solely for making emergency calls.

It is an object of the invention to provide an emergency calling device which is easily carried or worn by the user, easily set up, easily authorized, easily deauthorized, and which easily makes emergency calls.

It is an object of the methodology of the present invention to provide a user with access to the most powerful and effective emergency calling and location technology available, which is via landline telephone to a national emergency response number such as 911 linked to Enhanced 911, and to provide a user with this access literally within their reach in as many locations as possible.

SUMMARY OF THE INVENTION

In accordance with the present invention, the foregoing objects are met by providing an emergency calling device which the user can carry or wear comfortably and unobtrusively and which is activated to make an emergency call when the user slides back the cover of the call pod and presses the single button beneath while within range of any authorizing base unit. Preferably, the device is carried by the user in his or her pocket, or worn on his or her body directly with an adjustable strap or affixed to or incorporated into a watch, watchband, piece of jewelry, or the like, so they may keep the device on their person all or most of the time so it will be immediately within reach the moment an emergency strikes.

Preferably, the device, or system, consists of a call pod, a base unit, and extension phone interrupt boxes. Preferably, the call pod is physically placed on the base unit to make an electronic connection, the base unit owner enters his password and the call pod owners name and presses the "authorize call pod" button to authorize the call pod. With this methodology, a call pod can be authorized by a multiplicity of base units, providing a very extensive and personally-tailored network for emergency calling for each call pod.

Preferably, the base unit displays prompts and a list of authorized call pod owners names using light-emitting diodes or a liquid crystal display. Preferably, the base unit owner can enter his password and then deauthorize any call pod he wishes by selecting the call pod owners name on the display and pressing the "deauthorize call pod" button. Preferably, after an emergency call is made the calling call pod owners name is displayed and is also stored in a separate memory location for later recall if desired. Knowledge of the calling call pod owners name can serve to catch mischievous or malicious misuse of a call pod, to deter mischievous or malicious misuse of a call pod, to aid in determining which call pod needs to be deauthorized, and to aid in the swift location of the calling individual experiencing an emergency because there may be locations within range of the base unit where it would be most probable that the caller would be.

Preferably, two-way audio communication between the call pod and the base unit, and between the base unit and the landline telephone system, is made using robust, reliable, proven and commercially available components and circuitry such as those which comprise the long-established digital spread spectrum cordless telephony. Further functionality is effected electronically using a programmed microprocessor, and this functionality includes running a system self-test, a battery level test, and a search for an authorizing base unit within range, each time the call pod's sliding cover is slid back. If the system self-test, and the battery level test check out well, and if there is an authorizing base unit within range, and audio dial tone is transmitted to the call pod to communicate these facts to the user. If there is a call in progress on the authorizing base units telephone line, a simulated dial tone is transmitted to the call pod. If, after receiving a simulated dial tone, the user then presses the emergency calling button on the call pod, the base unit will terminate the call in progress and place the emergency call.

Preferably, the device includes call interrupt boxes which can be placed between any extension phone and the landline phone jack into which it is plugged, so calls in progress on extension phones can also be terminated. Preferably, the base unit communicates with these interrupt boxes, to interrupt a call in progress, on a separate frequency than that with which the base unit communicates with call pods, so that operation will go unnoticed by the call pods and so it will keep to a minimum the hardware and software needed within the call pod for maximum miniaturization.

Preferably, the call pod has an impact-resistant, water-tight case with a sliding cover, a single emergency calling button beneath the sliding cover, a speakerphone speaker, a microphone, and a sliding switch for selecting one of 3 modes: speakerphone, phone and monitor-only or mute. Preferably, the call pod has a means for attaching an optional strap so it can be carried in a pocket or worn.

Preferably, the base unit is pre-programmed with the national or regional emergency telephone number of the country where it is to be sold. Preferably, another model of the base unit has the capability for the user to input an emergency telephone number into a base unit, and to have that number displayed on the base unit for call pod owners to see so they will be aware of where their emergency calls will be sent in an emergency. This enables the device to be used in those countries, regions and rural areas where there is no national or regional emergency telephone number and thus emergency calls must go to a local emergency telephone number. It also enables the device to be used where there is not sufficient purchasing population served by a national or regional emergency telephone number to make it commercially feasible to make a base unit with that dedicated number. An advantage of having a base unit pre-programmed to have a single national or regional emergency telephone number is that it authorized call pod owners can have confidence that their emergency calls via a given base will all go to the expected central emergency responders.

Preferably, different models of the base unit each incorporate different telecom communications infrastructures and connectors so they can be compatible with the different landline phone line communications standards and protocols in different places in the world. Preferably, a base unit model for traveling can incorporate several different telecom standards and protocols so it can be used in a variety of countries and/or regions.

It is not intended that the invention be summarized here in its entirety. Rather, further features, aspects and advantages of the invention will be set forth in, or will be apparent from, the following description and drawing.

DESCRIPTION OF THE DRAWING

The drawing depicts the multi-site emergency calling capability of the device resulting from the methodology of the present invention. The drawing depicts an example of the calling capabilities of 3 separate call pods and the authorizations of 3 separate base units at different locations. In the example in the drawing, Call Pod A has emergency calling capability from Bases 1, 2, and 3; Call Pod B has emergency calling capability from Bases 2 and 3; and Call Pod C has emergency calling capability solely from Base 3. In the example in the drawing, Base 1 has granted authorization for itself to be used to make emergency calls to emergency responders to Call Pod A; Base 2 has granted authorization for itself to be used to make emergency calls to emergency responders to Call Pods A and B; and Base 3 has granted authorization for itself to be used to make emergency calls to emergency responders to Call Pods A, B, and C.

DETAILED DESCRIPTION OF THE INVENTION

This invention pertains to the fields of cordless telephony, personal security alarms, national emergency telephone numbers and systems, and regional emergency telephone numbers systems.

This patent so fully discloses the manner and process of making and using this invention that the invention can be made and used by one who is skilled in the art of cordless telephony, including digital spread spectrum, and in the arts of radio communications, antennas, integrated circuits, electronic hardware and software, liquid crystal displays, and telephony housings.

Set forth herein is the best mode contemplated by the inventor of carrying out, making and using, this invention. It is understood that the broad concept of this invention could be implemented in a variety of embodiments, or with different modifications. This description of the preferred embodiment envisioned by the inventor is not intended in any way to limit the broad scope of this invention to this preferred embodiment.

This invention utilizes several very robust and effective technologies: cordless telephony, the national landline telephone system, the national emergency telephone number system, and the national enhanced emergency number system (called E-911, in the United States). It adds to these: the original and unique ability to remotely (from ones' wrist, pocket, etc.), from a multiplicity of locations, call direct to the local PSAP, worldwide, via landline phone line, thereby accessing the local PSAP's incoming-landline-call capability to instantly know 'the precise street address, with on-site directions', enabled by the enhanced emergency number system. Beyond this, it offers 2-way full-duplex voice in 'hands-free' speakerphone mode and in telephone mode, and 1-way voice in 'monitor-only' mode. It has the capabilities of seizing the telephone line from other calls in progress; and of automatically conducting a self-test, a range test and an authorization test, whenever it's cover is slid back. Further, it has a dedicated emergency call lithium battery with a ten-year shelf life, and a separate, dedicated authorizing and testing lithium battery, also with a ten-year shelf life, to eliminate the need for recharging batteries and provide maintenance-free readiness.

The following five operations describe the preferred embodiment for implementation of the method, device and use of the invention, and provide the information needed for one skilled in the art to make the device.

First, Require Initialization of Bases and Call Pods:

To initialize a base, the base should display an initial prompt when its power is first turned on, requesting the base owner to input their exact name, as opposed to a nickname or euphemistic name, or the exact name of their entity, for instance the name of the store where the base will be connected to a landline telephone line.

After the base's name has been entered, then the base should display a prompt to enter a password. Entering a password may be optional, but should be strongly encouraged as essential in locations where the public, or malicious or mischievous individuals, could have access to the base. If a user enters a password, the base should then display a prompt requesting that the password to be input a second time, to verify that it was entered as intended. Though the preferred embodiment for entering the password is with an alpha-numeric keypad with one character or digit per key, other methods are possible, such as a telephone keypad, a point and click joy stick and display, a pressure-sensitive LCD screen, voice recognition, etc.

Upon successful entry of the mandatory base name and completion of the optional password entry, a unique code is randomly generated, by using random number generation; or preferably, the base already has a unique code through its license plate ID chip, or obtained in a manner similar to giving a serial number to a piece of software. This unique code is referred to as the "authorizing base code". It is stored in the base's memory.

Similar to initializing a base, to initialize a call pod, the call pod is placed on any base, thereby bringing the call pod into contact with electrical contacts on the base. Alternatively, cordless telephony, radio frequencies, bluetooth, infra red, other means of communication could be used for communication between the call pod and the base. When the base detects the presence of the call pod, then the base queries the call pod to determine if it has been initialized yet. If the call pod is not yet initialized, the base displays a prompt, requesting the call pod owner to enter his or her exact name.

The instructions accompanying the invention should instruct the call pod and base owners to enter their own exact names when they are initializing their devices, as opposed to nicknames or euphemistic names. This is because, after an emergency call is made, the name of the owner of the call pod placing the call is displayed on the base. When emergency responders arrive, it could be very useful and timesaving to read the exact name of the caller on the base, as opposed to a nickname, thereby giving emergency responders a better idea of the most probable places to look for the given individual.

Though the preferred embodiment for entering the call pod owner's name is with an alpha-numeric keypad on the base, with one character or digit per key, other methods are possible, such as a telephone keypad, a point and click joy stick and display, a pressure-sensitive LCD screen, voice recognition, etc.

Upon successful entry of the mandatory call pod owner's name, a unique code is randomly generated, by using random number generation; or preferably, the call pod already has a unique code through its license plate ID chip, or obtained in a manner similar to giving a serial number to a piece of software. This unique code is referred to as the "call pod code". It is stored in the call pod, in correlation to the call pod owner's name.

Second, Require Authorization of Call Pods:

Prior to use, a call pod needs to be authorized by a base. To authorize a call pod, place it the on the base that will grant authorization. The call pod may be dropped into a slot or depression to bring it into contact with the electrical contacts on the base. Alternative methods are possible, using such communication technologies as cordless telephony, radio frequencies, bluetooth, infra red, etc.

Next, press the "Authorize Call Pod" button on the base. If this button is pressed without a call pod on the base, a prompt to place a call pod on the base will be displayed on the base. If there is a call pod on the base, the pod owner's name will then be displayed on the base's display. This enables the base owner to verify that the call pod he is about to authorize, is initialized by, meaning belonging to, a responsible party whom he trusts. This is to contribute further to prevention of malicious or mischievous misuse of the system.

Next, displayed on the base, along with the call pod owner's name, will be a prompt to enter the base's password.

After the password is entered, there is an exchange of information between the call pod and the base. The call pod sends its paired call pod owner's name and call pod code to the base, to be stored in the base's memory, along with the similar data pairs from all its other authorized call pods. The base sends its authorizing base code to the call pod, which the call pod then adds to its string of authorizing base codes, (each separated by a separation sequence), and stores it in its memory.

A preferred embodiment is to not store and display the authorizing bases owners' names in the call pod along with the correlated authorizing base code. This is because, if the call pod is lost, then a prankster could determine which bases have authorized that call pod, and could use that call pod to place prank emergency calls via any of those bases. However, if it is determined that call pod owners would like to see the list of their authorizing bases, they could be displayed on any base.

Third, to Check if a Call Pod is within Range of an Authorizing Base:

The call pod user slides back the call pods' protective cover, which covers the emergency call button. This protective cover prevents unintentional calling of the national emergency telephone number. When the call pod user begins to slide back the protective cover, an electrical contact is made, either mechanically or by means of a Hall Effect sensor. This initiates the call pod's system self-test, checks its batteries' capacities, and transmits its string of authorizing base's codes, with each accompanied by its own call pod code.

Whenever a base is plugged in, it will be listening for its own unique code, and will respond only when it hears its own unique code paired with one of its authorized call pod's unique codes.

Transmitting all the codes is feasible because of the very concise amount of data being transmitted and because of the speed of transmission of electronic data. The authorizing base codes are all of the same predetermined length, paired with the call pod's code, and are separated by separator sequences, which are recognizable as separators by bases. The string of unique codes is transmitted repeatedly for a period of time until a base identifies its own unique code paired with the unique code of a call pod it has authorized. When the base recognizes this pair of codes, it responds by behaving in the same manner as a standard cordless telephone base does when communicating with its cordless telephone handset. The base then opens the landline telephone line and transmits the dial tone.

If the system is working, the batteries' capacities are adequate, and the base recognizes the unique sequence of its authorizing base code and one of its authorized call pods' unique codes while there is another call in progress on the landline telephone line, then a simulated dial tone is transmitted to the call pod, and the base continues to listen for a press of the call pods' emergency call button.

Opening the protective cover and hearing a dial tone provides confirmation that the system is working, that there is adequate battery capacity remaining, and that the call pod is within range of an authorizing base. If there is a system error or inadequate battery capacity of the primary or secondary batteries, or no authorizing base within range, either an audible error message specifying the problem is generated by the call pod and delivered through the call pod's speakerphone speaker, or no dial tone will be heard, which will let the user know that the call pod is not working, has low batteries, is out of range, or is unauthorized by an in-range base.

A call pod user can always check if their call pod is authorized by a particular base, by dropping it into the slot on the base, and the base's display with show either "Press the 'Authorize Call Pod' Button to Authorize", or "Authorized Call Pod, and the call pod name".

Fourth, to Make Emergency Call:

After sliding open the protective cover, if the system checks are successful and the battery checks are adequate, and if the call pod is within range of an authorizing base, then a live (or simulated, if there is another call using the landline telephone line) dial tone is transmitted to the call pod, confirming readiness of the system to place an emergency call.

If the call pod user then presses the emergency call button, the power source will be switched to the primary battery; and if that primary battery runs low on power during an emergency call, the power source will be switched back to the secondary battery to extend the possible length of the call as long as possible.

When the call pods' emergency call button is pressed, it sends a signal to the base to dial the national emergency telephone number. The base will seize the telephone line from any call in progress, if necessary, as well as send a signal to any interrupt boxes plugged into extension phone outlets for the same line. The interrupt boxes require prior authorization in the same manner as a call pod, so that the interrupt signal from the base will only interrupt those interrupt boxes, and not ones nearby, such as in the next apartment. The call pod then proceeds to send the base a signal, which tells the base to dial the pre-programmed emergency telephone number.

If a call pod's transmission is heard by two or more authorizing bases, the call pod selects the strongest signal to establish communication with.

If the emergency call button is pressed, prior to the call pod or base recognizing an authorized call pod within range of an authorizing base, the press of the emergency call button is stored in the call pods' memory for a period of time. This press of the emergency call button is acted upon when an authorizing base recognizes the authorized call pod and a live, or simulated if another call is in progress, dial tone is produced. This "emergency call waiting to be sent" is deleted after a period of time, or when the protective cover is closed.

The emergency call button beneath the protective cover is preferably visually labeled with the digits of the national emergency telephone number, such as 9-1-1 in the USA. In countries that have different national emergency numbers for different services, such as in Japan, which uses 1-1-0 to call for police and 1-1-9 to call for fire and medical help, there could be two, or three, labeled emergency buttons.

The call pod will hear, broadcast over its' speakerphone speaker, the dial tone, the dialing sound, ringing, and then the call takers' voice, in the same order and fashion as a standard cordless telephone. The preferred embodiment is for the speakerphone mode to be the default mode. This enables hands-free operation, which can aid victims who need both hands free for dealing with their emergency. It is also helpful to the elderly or hard of hearing, and provides instant reassurance that the call is being placed. In certain circumstances, the audible emergency call may also cause a criminal perpetrator to flee, knowing that emergency help has been summoned.

If it is desired to have the call pod in telephone or 'monitor only' mode, an external sliding or toggle switch can be switched to the new mode prior to opening the cover, or during the course of a call.

The base may also have the capability to be user programmed to call other emergency numbers of varying lengths, and it can incorporate the telephony capabilities of other countries, to enable it's use in countries with different emergency telephone numbers and different telephony standards.

Fifth, to De-Authorize a Call Pod:

Under certain circumstances, for instance when an employee is terminated by their place of employment, a base owner may want to de-authorize a particular call pod. This can be done by pressing the "De-Authorize Call Pod" button on the base. The display on the base will then prompt the base owner to enter their password. After entering the correct password, the display prompts the base owner to select the call pod to be de-authorized. The list of authorized call pods is displayed, and can be scrolled through to locate the desired call pod. When that call pod has been selected, for instance by being the highlighted call pod on the display, the base owner presses the "De-Authorize Call Pod" button once again to delete the selected call pod name and its accompanying call pod unique code.

Further, Preferred Embodiments

A preferred embodiment is that there be a sliding switch, or the like, to change the mode from speakerphone, to phone, to "monitor only". Phone mode puts the dial tone and the incoming voice from the PSAP at standard phone volume. "Monitor only" mutes the dial tone and the incoming voice from the PSAP while letting the PSAP receive transmission from the caller. "Monitor only" mode is useful for certain critical situations, such as when a call pod user may feel reluctant, constrained, or unable to place an emergency call while they are within earshot of an intruder or a domestic abuser or an intruder, for fear of aggravating that individual. A brief announcement, that this call is being made in "monitor only" mode, would be transmitted to the PSAP call taker as soon as the PSAP call taker answers the call.

A further preferred embodiment is for the call pod user to be unable to terminate a call pod's call to the national emergency telephone number, once it is placed. It would be up to the PSAP to disconnect the call. This serves to prevent accidental termination of an emergency call by the caller. It allows the PSAP call taker to listen in on emergency situations, for instance, when the caller changes their mind about calling or when another person tries to terminate the call, both of which can happen in domestic abuse situations. This preferred embodiment also can be a deterrent to the placement of non-emergency calls to the national emergency telephone number, including calls to test the functionality of the call pod and authorizing base. This is because it gives the PSAP call taker an opportunity to reprimand and educate a non-emergency call maker about the illegality of misusing the national emergency telephone number.

A further preferred embodiment is that there be two lithium coin cell batteries to power the call pod. The primary battery is reserved for placing emergency calls. The secondary battery is used 1) for initializing the call pod, 2) for authorizing the call pod by exchanging information with authorizing bases, and storing authorizing base names and authorizing base codes, 3) for conducting system self-checks, battery level and presence checks, and whether an authorizing base is within range. The secondary battery is also used after the primary battery is used up during an emergency call, if necessary.

A further preferred embodiment is for the base to have a battery to provide power for the base in the event of a power outage.

A possible feature would be for the call pod to incorporate an on-site locator capability, where the call pod transmits a signal after the placement of an emergency call, which the base can recognize, and which causes the base to display a directional arrow pointing toward the call pod. The base could also indicate the signal strength from the call pod. The base could also have battery power so that it could be unplugged from the landline telephone line and the wall socket power source, and used as a mobile locator to home in on the call pod which would be transmitting an intermittent signal.

This invention provides 1) Fingertip access to emergency help, which is crucial since many emergencies prevent one from reaching a phone. 2) Instant, direct calling to the local 9-1-1, which saves crucial time in situations where seconds can make a life and death difference. In contrast, calls placed by cell phone to a national emergency telephone number are answered by the state police barrack or a regional wireless answering center, either of which could be a hundred miles away, or more. 3) The instant, pinpoint, street address location of the caller, because the call is being placed on a landline phone line and therefore automatically accesses the nationwide Enhanced 9-1-1 location database. In contrast, a cell phone can only derive latitude and longitude coordinates to within 150 meters, which can include many businesses, homes and apartments, and even this less precise derivation is currently achievable only 60% of the time. 4) Instant, pinpoint on-site directions, such as "Apartment E-$2^{nd}$ floor, 3rd door on left", which is also automatically provided by Enhanced 9-1-1. 5) 2-way voice, with 3 modes: 1) the default mode of speakerphone, 2) phone mode and 3) 'monitor only' mode. 'Monitor only' is a mode which can provide the emergency call taker with crucial information about the nature of the emergency in circumstances where it would be hazardous for a perpetrator of a crime to be alerted to the fact that a victim is placing an emergency call. This voice capability of the call pod enables the caller to give information about the emergency, and enables the caller to be given instructions and/or reassurance.

Thus, this invention consists of two parts: a call pod and a base, with an optional third part being a call interrupt box to seize the telephone line from any calls in progress on an extension phone when an emergency call is made.

The call pod is a tiny, pocket-sized, or otherwise wearable, single-button, 2-way voice, cordless phone, with speakerphone, telephone, and 'monitor only' modes.

The base, which plugs into a landline phone line outlet and power outlet, uses cordless phone technology to listen for, and place, calls from call pods to which it has given prior, password-protected authorization to place emergency calls via the landline phone line to which it is connected.

The base is pre-programmed to call a national emergency telephone number when it detects an emergency call signal from an authorized call pod that's generated when the call pod's single button is pressed. The base may also have the capability to be user programmed to call other emergency numbers of varying lengths, and it may incorporate the telephony capabilities of other countries, to enable it's use in countries with different emergency telephone numbers and different telephony standards.

The base's password-protection requirement is to prevent mischievous or malicious calling of the emergency number. Requiring the a password to authorize a call pod ensures that only those whom the base owner trusts will be authorized to place emergency calls via that base.

The base is required to be "initialized", prior to use, by entering the base owners' name and selecting a password. A unique code is randomly generated, or factory assigned, for the base, and the base owner's name and unique code are then stored as a pair in the base's memory. The password is also stored in the base's memory.

The call pod is required to be "initialized", prior to use, by entering the call pod owner's name. Initialization is accomplished by, first, establishing communication between the call pod and the base. Preferably, this is achieved by physical contact with electrical contacts, though it could also be achieved with the system's cordless communication capability, or by swiping a magnetic strip, infra red, radio waves, or other means of communication. When the base detects an uninitialized call pod, it prompts the call pod owner, visually and/or audibly, to enter their full name using the keypad, touch screen, mouse, joystick, stylus, rotating dial, or other means on the base. A unique code is randomly generated, or factory assigned, for the call pod, and the call pod owner's name and unique code are then stored as a pair in the memory of the call pod.

A base must "authorize" an initialized call pod, in order to enable that call pod to place emergency calls via that base. Preferably, this is accomplished by placing the call pod on the base and pressing the base's "Authorize Call Pod" button. This will cause the base to acquire the name and unique code of the call pod, which it then stores in the base's memory.

The complete list of call pods, authorized by a particular base, may be seen by pressing the "Display Authorized Call Pods" button on that base, and then the list will be displayed on the base, ie. on an LCD screen, and/or audibly. As the list may be long, it may be scrolled through to see all the names. The complete list of bases authorizing a particular call pod, may or may not, be made accessible in a similar manner. If it is deemed desirable, a "Display Authorizing Bases" button can be placed on the base to carry out this function.

When an emergency call is placed via a particular base, the calling call pod owner's name is displayed on that base. It remains in memory and displayed on that base, as having placed an emergency call, until it is removed in a procedure which requires the base owner's password. This serves as a further deterrent to mischievous or malicious calling of the national emergency telephone number, because the base owner and the emergency responders will be able to see the call pod owner's name on the calling base.

The base owner has the capability of de-authorizing an authorized call pod, for instance, for a lost call pod, or the call pod of an employee no longer employed at that location. A means to do this would be to have a "De-authorize Call Pod" button. After pressing this button, the base would prompt the base owner to enter their password. Then the list of authorized call pods would appear on the base's display and the base owner would select the name to be de-authorized and press the "De-authorize Call Pod" button again. This would erase the call pod owner's name and unique code from the base's memory, removing the calling capability of that call pod and freeing up memory for another authorization.

A call pod can check if they are still authorized by a given base by opening the call pod's protective cover when they are within range of that base. Opening the call pods' protective cover initiates a self-check of the call pod's circuitry, checks the call pod's two battery levels, and checks if the call pod is within range of an authorizing base. If each of these tests are positive, a live dial tone, (or a simulated dial tone if there is another call on the telephone line), will be audible from the call pod. If the system tests or battery checks show a problem, if the call pod is out of range of an authorizing base, a message to that effect could be generated audibly, or no sound could be generated, which would also indicate that the call pod was not in readiness to place an emergency call.

The call pod's self-test, battery check, and in-range authorizing base check, are all performed using the secondary of two lithium coin cell batteries. This enables the call pod to make these checks without using the primary battery, which is reserved exclusively for making emergency calls. If an emergency call is of such length that it outlasts the primary battery, the system will switch to the secondary battery to extend the call.

Each call pod can be authorized by a multiplicity of bases. Each base can authorize a multiplicity of call pods.

The call pod's default mode is full-duplex, speakerphone mode. With a 3-position sliding or toggle switch, the call pod can also be placed in regular telephone mode, or in monitor only mode, which activates the call pod's microphone, but not it's speaker. Telephone mode and monitor-only mode are for use in domestic violence or intruder situations where it is important that no one but the caller realizes that an emergency call is being made. The sliding or toggle switch can be switched either before or after sliding open the protective cover. Sliding closed the call pod's protective cover returns the 3-position sliding or toggle switch to the center position, which is the default, speakerphone mode.

The base could also have an emergency button pre-programmed to dial the national emergency telephone number, and protected beneath a protective cover.

A preferred embodiment is that, if the call pod tries to make an emergency call while another party is using that telephone line, the base will seize the line to place the 9-1-1 call, and will transmit a radio signal to small interrupt boxes which are plugged into any extension phone wall outlets, between the wall outlet and the extension phone, so the line will also be seized from those extension phones. The base and interrupt boxes will maintain the connection to the PSAP until the call is terminated by the PSAP. The interrupt boxes are authorized like a call pod on the base, to ensure that only that base is able to activate them.

A preferred embodiment is that, if two or more authorizing base signals are detected, the call pod will establish a connection with the base having the strongest signal.

The robust and effective technologies of landline telephony and cordless phone telephony offer a more reliable and ubiquitous system than the emerging cell phone and mobile phone communication systems, which can be vulnerable to spotty coverage and architectural and geographic interference. Also, the invention's single-button, display-less, coin cell powered design can be so small, anyone can wear it all the time; so it provides calling capability at a victim's fingertips in an emergency, which is crucial in emergencies that could keep one from reaching a phone. Further, the lithium coin cell powered embodiment of the invention enables it to be ready without recharging for ten years, in contrast to cell phones which need recharging every few days.

Some countries have different emergency numbers for different emergency services; for instance, in Japan the police and ambulance services are reached by calling one 3-digit number, and the fire department is reached by calling a different 3-digit number. To accommodate this, the call pod for Japan could have 2 different call buttons, each labeled for the corresponding services, and different call signals which the base could recognize. Other models could have 3 buttons, and transmit 3 different signals to the base, to dial different phone numbers for police, fire and ambulance services.

A further possible embodiment could be to incorporate multiple different cordless telephony standards into the call pod and base, to enable them to operate in multiple countries with different cordless telephony standards. It could also help minimize the number of different versions of the product, and even provide a product that would be able to provide worldwide service.

The apparatus consists of three parts: 1) a base station, utilizing a cordless phone base chipset and custom logic on an integrated circuit, which plugs into a regular landline phone wall jack and wall power outlet, 2) a corresponding handset or 'call pod', which utilizes a cordless phone handset chipset and custom logic, and which is small enough to wear, or carry unobtrusively in one's pocket, and 3) small, interrupt boxes, which plug into the landline extension phone wall jacks, and are activated by a transmission of a radio signal from the base, to seize the phone line, if necessary, when an emergency call is initiated.

The handset and interrupt boxes can be authorized, by electrical contacts, swiping a magnetic strip, radio frequency transmission, infra red or other means, by a multiplicity of password-protected base stations. During this authorization, the call pod and base each exchange their paired name and unique code information, which are used to grant permission to a given call pod to call from a given base, and to identify which call pods have been granted authorization.

The cordless communications between the invention's cordless call pod and its cordless base could use a chipset like Texas Instruments' TMS532C5000 DSP Platform, with their C54CST telephony algorithms. Alternatively, "The Wave" chip family of wireless spread spectrum voice and data controllers based on the ZiLOG (ZiLOG Inc., Campbell, Calif.) Z87L02 device. It is easily switchable between 32 Kbps voice and data in half- and full-duplex communication, and the chip family support adaptive frequency hopping at rates up to 250 hops per second. Flexible network configuration parameters enable a variety of networks such as point-to-point, multipoint peer-to-peer, and star configurations where a single master can control a large number of terminals. It is robust in high interference environments, offers secure communications, and a range of up to five miles with the appropriate RF transceiver, though 600 feet would be adequate range in this application. The Wave chip supports a range of frequencies, including the 902 MHz, 2.4 GHz and 5.8 GHz ISM bands.

Incorporated in the call pod is a single button pre-programmed obtain a dial tone and dial "9-1-1", preferably protected beneath a sliding cover which can be slid back with one hand. This enables the cover to be opened and the single button to be pressed while in ones pocket if the emergency requires discreet activation, and it provides protection against unintentional activation.

Also incorporated in the call pod is a microphone to pick up the callers' voice, and environmental sounds. Picking up environmental sounds could be very valuable in emergencies where the victim must of necessity remain silent; for instance, if they are hiding, if they are pretending to be asleep or dead, or if speech would provoke their intruder, particularly speech communicating the nature of the emergency to a 9-1-1 call taker.

Also incorporated in the call pod is a speaker or speakers to provide regular phone and speakerphone sound levels of the 9-1-1 call takers voice. The value of a regular phone sound level is that it could allow a victim to receive communication from a 9-1-1 call taker unbeknownst to an intruder. The value of a speakerphone sound level is that it could allow a victim to receive hands-free communication from a 9-1-1 call taker in situations where the caller needs to be using their hands, for instance, if the caller needs to keep pressure on a wound, or perform CPR on a heart attack victim, or perform the Hymlich Manouver on a choking victim, or gather children to exit a fire.

Also incorporated in the call pod is a switch to switch between the three modes of operation: speakerphone, phone, and 1-way monitor-only. Monitor-only mode is valuable in situations where an intruder or assailant is in close proximity to the caller and would be provoked if they knew an emergency call was being placed. This switch is outside the cover, and preferably activateable by one hand, while the device is in one's pocket. A slider switch fulfills this, and an identify-able feature on the device, such as a raised bump, would indicate to the user which direction to slide the switch to place the device in monitor-only mode. A preferred embodiment of the invention would be for the default position to be speakerphone, in the center of the three positions. Pressing the rocker switch, or sliding the sliding switch, toward the bump would place it in monitor-only mode, and sliding the switch in the other direction would place it in regular phone mode. A preferred embodiment of the switch would be for its' length of travel to be such that, in an emergency, one could quickly and easily ascertain, without looking, what position it was in. A preferred embodiment would be for the switch to be able to change position to any of the three modes at any time during an emergency call.

A preferred embodiment for the base is to have an LCD on its surface, to display prompts and names of authorized call pods. A possible additional feature would be to display the names of bases authorizing call pods.

A preferred embodiment of the inventions is to have the dial tone audible by speakerphone whenever the protective cover is slid back, and certain conditions are met. This would signal that the device was within range of an authorizing base station, that it had adequate battery power, and that all it's circuitry had just been through a self-check and was working correctly. If any of these conditions were not met, the call pod could be silent to indicate this, or alternatively, an audible message could be relayed, stating the nature of the problem, and the suggested remedy.

The call pod device uses two lithium coin cell batteries. One battery would be reserved exclusively to power an emergency call. The other battery would power a check that the device is within range of an authorizing base, a check that there is adequate battery power in both batteries, a check that the circuitry is working properly, and it would power an audible real dial tone to confirm that all checks were successful and positive, or it would power an audible message stating the nature of the failed check or checks, and suggesting a remedy or remedies.

A number of buttons on the base implement various functions, such as "Initialize Call Pod", "Initialize Base", "Authorize Call Pod", "Display Call Pods' Authorizations", "Display Bases' Authorizations", "De-Authorize Call Pod".

The following description details the devices' operation, and uses the following abbreviations to do so:
CPUC—Call Pod's Unique Code (factory installed, randomly generated, or from a 'license plate' id chip or code)
CPON—Call Pod Owner's Name (input by Call Pod Owner)
BUC—Base's Unique Code (factory installed, randomly generated, or from a 'license plate' id chip or code)
BON—Base Owner's Name (input by Base Owner)
BOP—Base Owner's Password (input by Base Owner)

Initialization of Call Pod
1—The Call Pod is put in contact with any Base.
2—The Base recognizes that this Call Pod is not initialized, and prompts the Call Pod owner: "Call Pod Owner: Input your name to initialize your Call Pod". This CPON must be entered to initiate functionality of the Call Pod.
3—If an already-initialized Call Pod (one with a CPON) is put in contact with a Base, the Base will display the CPON, and either "Authorized" or "Unauthorized", depending on which is the case.

Initialization of Base
1—When the Base is first plugged in, (between the phone outlet and any phone, if any phone is plugged into that phone outlet), the Base recognizes if the Base has not yet been initialized.
2—If not initialized, the Base prompts the Base owner: "Input the Base owner's name to initialize this Base." This BON must be entered to initiate functionality of the Base.
3—An option, or requirement, is that the Base then prompts the Base Owner to select and enter a Password, and to do so twice, to confirm that it was entered as intended.
3—If a Base is already initialized, the Base will be able to display its BON and BUC.

Authorization of Call Pod
1—The (initialized) Call Pod is put in communication with any Base, preferably by contact.
2—That Base recognizes that this Call Pod is not authorized to call via this Base.
3—Base prompts Base owner: "Enter Base Owner's Password to authorize this Call Pod".
4—Correct entry of the Base Owner's Password triggers the Call Pod to send it's CPUC along with it's CPON, both of which are then stored in the Base's database of authorized Call Pods.
This database can be later reviewed and items deleted by the Base owner.
5—If the Call Pod is already authorized by the Base when it is brought into contact, the CPON and "Authorized" are displayed.
6—Whether a Call Pod is authorized or not, a Base will be able to display a Call Pod's CPON and CPUC when it is brought into contact with that Base.

Testing a Call Pod to Check if it is in Range of an Authorizing Base
1—The Call Pod emergency call button's protective cover is opened, which begins the check of whether there is an authorizing Base within range.
2—The Call Pod then automatically and repeatedly transmits a wake-up signal, and it's CPUC and CPON.

3—All initialized Bases are listening for a wake-up signal. If a wake-up signal is detected, the Base searches in its database for the CPUC and CPON that follows the wake-up signal.

4—If the CPUC and CPON are found in that Base's database, that Base acts like a cordless telephone establishing communications with one of it's handsets, and thus an actual dial tone is heard from the Call Pod.

5—This audible dial tone confirms that the Call Pod is within range and authorized.

6—If the calling Call Pod is authorized to call via that Base and another call is in progress on the Base's telephone connection, then a simulated dial tone is heard from the Call Pod.

7—If the Call Pod is either unauthorized by an in-range Base or out of range of an authorizing Base, no dial tone will be heard.

Placing an Emergency Call from a Call Pod

1—After an audible dial tone is heard (as a result of opening the protective cover as in steps 1-6, under "Testing Call Pod", above), the Call Pod's emergency call button is pressed.

2—The emergency call button press causes the Call Pod to seize the line if anyone else is on the line. Interrupt Boxes, physically situated between phone jacks and extension phones, also seize the line from any extension phones which may be in use.

3—911 is then automatically dialed (or 112 for European models, or a user-input different emergency number for locales with different emergency numbers).

4—The Call Pod now acts like a regular cordless phone, for 2-way communication with the 911 responder, including phone, speakerphone and monitor-only modes.

5—The emergency connection initiated by an authorized Call Pod is kept until terminated by the emergency number response center.

Interrupting an Existing Call to Place an Emergency Call

1—If there is an existing call on the telephone line or connection when an emergency call is made with a Call Pod, the Base disconnects the existing call, and seizes the line to place the emergency call.

2—Another aspect of the device are interrupt boxes which are plugged into extension phone outlets, between the extension phones and the phone outlets. In the event that there is an existing call, they are signaled by the Base, possibly on another frequency, to disconnect the call and seize the line for the emergency call being placed by an authorized Call Pod.

3—The emergency connection initiated by an authorized Call Pod is kept until terminated by the emergency number response center.

A preferred embodiment for other models of the device would be to have 1, 2, or 3 user programmable emergency telephone numbers for communities which do not have a PSAP, but which require the user to contact the police, fire and ambulance directly in an emergency. Those programmed numbers would be displayed on the base unit.

A preferred embodiment of the device is to have an internal antenna in the call pod, for compactness. To aid this, because of the wavelength preferable for an internal antenna, a preferred embodiment is to make the device to operate in the 5.8 GHz ISM band.

A preferred embodiment is to power the base device by plugging it into a standard household electric wall socket. A preferred embodiment is for the base device to also have a battery, preferably rechargeable, so that the base will have power to function normally for several days, in the event that there is a power outage or the power is cut.

The call pod case is constructed as small as possible, preferably out of polycarbonate plastic, for maximum durability. Data such as the password and call pod owners names are entered on the base with a data entry device such as an alphanumeric or telephonic keypad, a touch screen, a point and click joystick, or the like.

Communication between bases and call pods to authorize call pods, and to display names of authorizing bases and authorized call pods, can be managed by a variety of means, including electrical contacts on the base and call pod, or by infrared or radio frequency transmission, and the preferred embodiment is using electrical contacts.

It is understood that the broad concept of this invention could be implemented in a variety of embodiments, or with different modifications. This description of the preferred embodiment envisioned by the inventor is not intended in any way to limit the broad scope of this invention to this preferred embodiment.

What is claimed is:

1. A wearable device for making emergency telephone calls, comprising:
   a) a case;
   b) detecting means enclosed within said case for detecting authorization by a base;
   c) cordless communication means enclosed within said case for connecting to and communicating with an authorizing base;
   d) single button means attached to said case to initiate an emergency call to a preprogrammed emergency telephone number;
   e) microphone means within said case for audio transmission to the emergency responder;
   f) speaker means within said case for audio transmission from the emergency responder;
   g) checking means within said case for performing system checks, battery level checks and checks if an authorizing base is within range, each of said checks being initiated upon opening of said case, wherein a positive outcome of said checks results in an audible telephone dial tone communicated by said case;
   h) a base;
   i) cordless communication means enclosed within said base for connecting to and communicating with and authorized case;
   j) password controlled authorization means enclosed within said base for password controlled authorization of a case;
   k) detecting means enclosed within said base for detecting an authorized case;
   l) landline telephony communication means enclosed within said base for connecting to and communicating with emergency responders.

2. A device as in claim 1, wherein said single button means is protected by a sliding cover.

3. A devise as in claim 1, further comprising a data entry means on said base for entering a password and case owners' identities.

4. A Device as in claim 1, wherein said base's password controlled authorizing means comprises a password controlled authorizing means capable of password controlled authorization of a plurality of cases.

5. A Device as in claim 1, wherein said case's detecting means comprises a detecting means capable of detecting a plurality of authorizing bases.

6. A Device as in claim 1, wherein said base's detecting means comprises a detecting means capable of detecting a plurality of cases authorized by password control.

7. A Device as in claim 1, wherein said base also has a display means for displaying the identities of authorized cases.

8. A Device as in claim 7, wherein said base display means also displays the identities of cases placing emergency calls via that base.

9. A Device as in claim 1, wherein said case speaker means is adjustable by switch means to put the speaker in speakerphone, phone or mute/monitor-only mode.

10. A Device as in claim 1, further comprising 2 non-rechargeable battery means to provide a primary dedicated battery for emergency calling and a secondary battery for the secondary functions of initial authorization, and for checking if an authorizing base is within range.

* * * * *